United States Patent [19]

Hirsch

[11] 4,088,358
[45] May 9, 1978

[54] WASHER ATTACHMENT FOR A VEHICLE HEADLIGHT

[76] Inventor: William A. Hirsch, 1566 Tralee Dr., Dresher, Pa. 19025

[21] Appl. No.: 735,377

[22] Filed: Oct. 26, 1976

[51] Int. Cl.² ............................................. B05B 1/10
[52] U.S. Cl. ............................................. 239/284 A
[58] Field of Search ................... 248/226 E, 229, 231; 240/7.1 R; 239/284 A, 284 R

[56] References Cited

U.S. PATENT DOCUMENTS

| | | | |
|---|---|---|---|
| 2,706,023 | 4/1955 | Merritt | 298/231 X |
| 3,295,004 | 12/1966 | Hirsch | 239/284 A |
| 3,866,840 | 2/1975 | Harkrider | 239/284 A |
| 3,915,385 | 10/1975 | Hassinger | 239/284 A |

FOREIGN PATENT DOCUMENTS

| | | | |
|---|---|---|---|
| 87,131 | 4/1959 | Denmark | 240/7.1 R |
| 2,125,259 | 12/1971 | Germany | 239/284 A |

*Primary Examiner*—John J. Love
*Attorney, Agent, or Firm*—Robert K. Youtie

[57] ABSTRACT

A washer attachment for a vehicle headlamp including a fluid conduit for extension partially along the circumference of a headlamp envelope, mounting tabs extending from the conduit across the circumference of the envelope for clamping thereto by a circumferential mounting ring, and fluid inlet and outlet means for passing cleaning fluid to the conduit and dispensing the fluid from the conduit onto the headlamp envelope to clean the latter.

2 Claims, 4 Drawing Figures

U.S. Patent     May 9, 1978     4,088,358
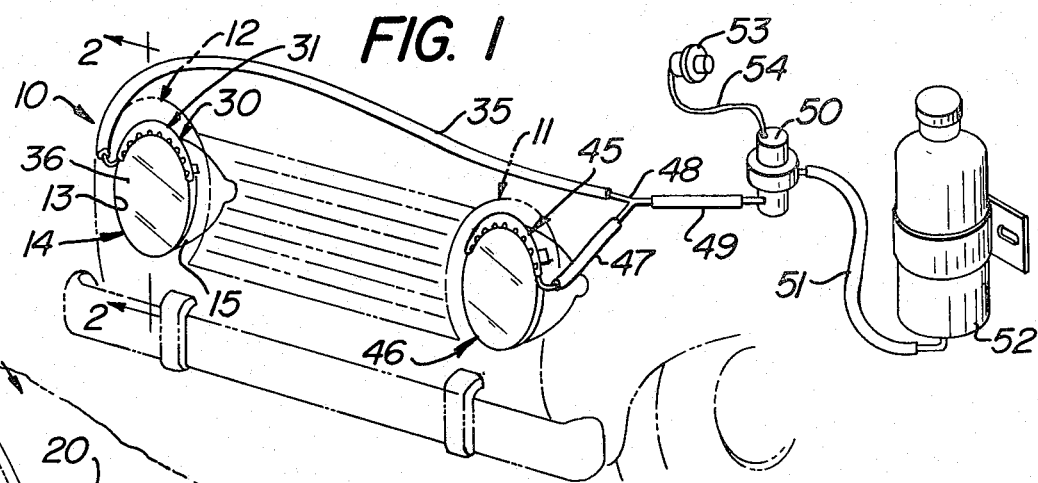
FIG. 1
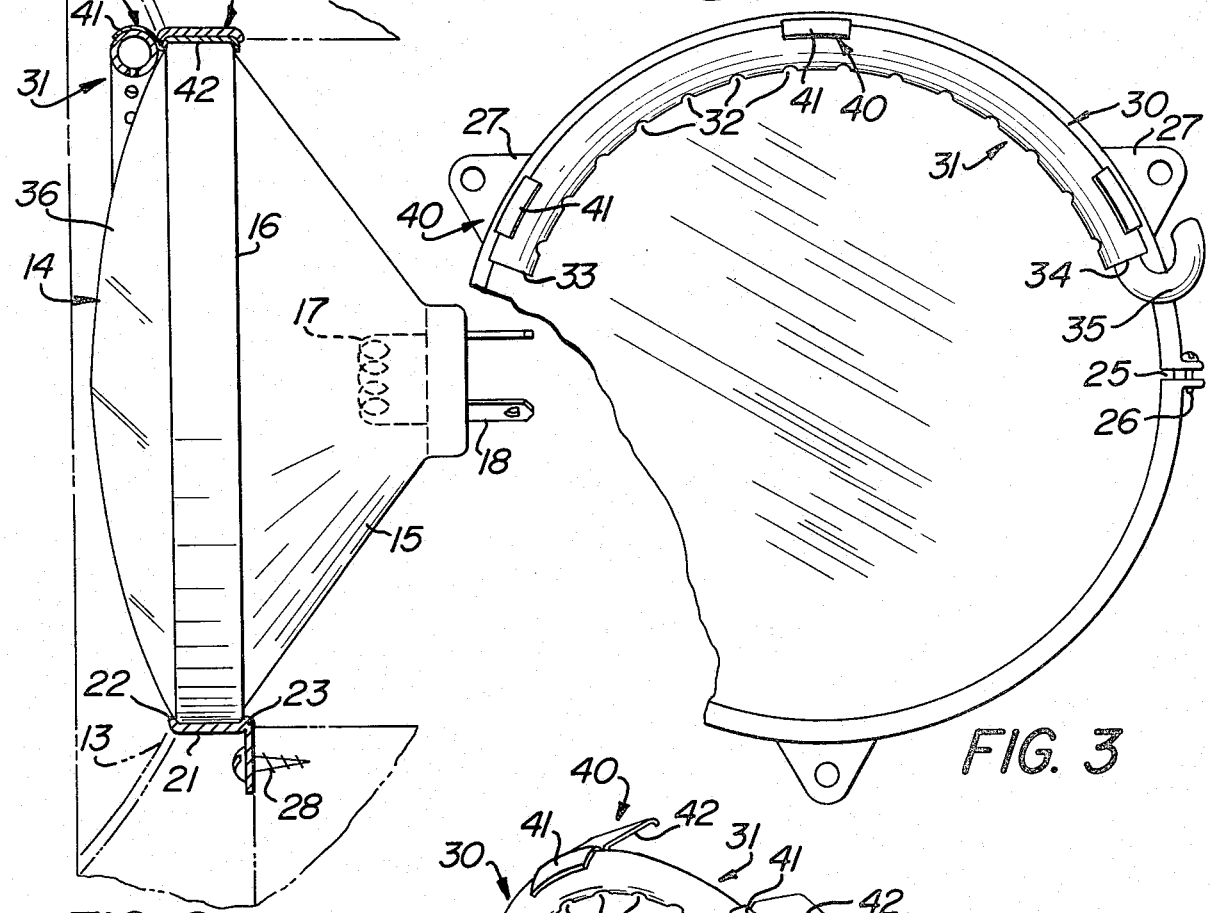
FIG. 2
FIG. 3
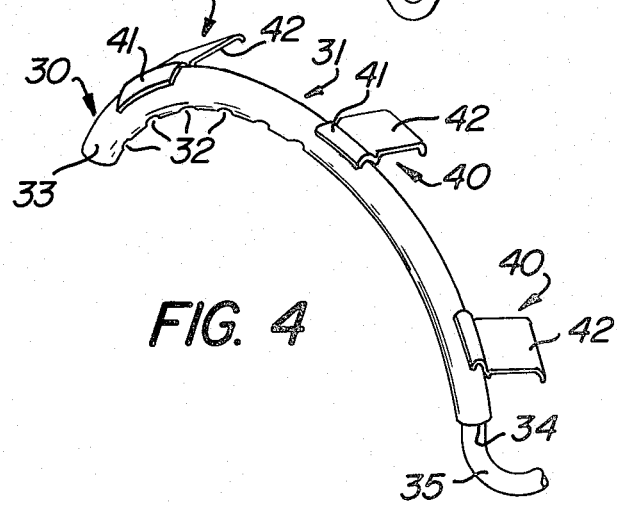
FIG. 4

WASHER ATTACHMENT FOR A VEHICLE HEADLIGHT

BACKGROUND OF THE INVENTION

While there are provided in prior art devices means for washing vehicle headlamps such as that disclosed in my prior U.S. Pat. No. 3,295,004, such prior devices have not met with general, wide acceptance for certain reasons. For example, these prior headlamp washing devices were relatively expensive and lacking in versatility, some requiring incorporation with the headlamp at the time of original manufacture so as to appreciably increase headlamp cost.

SUMMARY OF THE INVENTION

It is, therefore, one object of the present invention to provide a headlamp washer which is an attachment to a conventional headlamp, being extremely simple in construction for economy in manufacture and sale, and highly reliable in operation for a long, trouble-free useful life.

It is another object of the present invention to provide a vehicle headlamp washer attachment having the advantageous characteristics mentioned in the preceding paragraph which is adapted for quick and easy attachment to pre-existing vehicle headlamps, and capable of removal from a headlamp upon discard of the latter, for re-use upon a replacement headlamp.

It is still another object of the present invention to provide a washer attachment for vehicle headlamps, of the type described, which is capable of economic fabrication from a wide variety of materials, and be mass-produced, so as to achieve wide versatility in use with minimum cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a partial front perspective view showing a vehicle in phantom, and illustrating in association therewith the headlamp washer system of the present invention.

FIG. 2 is a partial sectional elevational view taken generally along the line 2—2 of FIG. 1.

FIG. 3 is a partial front elevational view, as taken from the left of FIG. 2.

FIG. 4 is a perspective view showing the washer attachment of the present invention apart from the vehicle.

DESCRIPTION OF THE PREFERRED EMBODIMENT

Referring now more particularly to the drawings, and specifically to FIG. 1 thereof, an automotive vehicle is there generally designated 10, and may include left and right headlight housings 11 and 12, which in accordance with the present styling may also serve as a wheel fender.

The headlight housings may be substantially identical, but of opposite hand, so that only the headlight housing 12 is shown in detail, see FIG. 2. It will there be observed that the headlight housing may be provided with a forwardly facing opening 13 for presentation therethrough of a lamp 14.

The lamp 14 is best seen in FIG. 2, and may include a hermetically sealed envelope 15, say of glass, formed with a circumferential or peripheral external rib or bead 16. Internally the envelope may be provided with suitable filament means 17, and projecting inwardly from the envelope 15, exteriorly thereof may be electrical connection means or plugs 18, for interengagement with suitable electrical receptacle means (not shown).

Extending circumferentially about the envelope 15, specifically along and about the peripheral or circumferential bead 16, is an annular split ring or lamp mount 20. The lamp-mounting ring 20 may include a generally circular strip 21, say of internally concave configuration, as best seen in FIG. 2, having outer and inner inturned lips 22 and 23, respectively, for circumposition about and snug conforming embracing engagement with the envelope bead 16. Thus, the strip 21 of mounting ring 20 may be considered as transversely, internally concave.

The strip 21 of mounting ring 20 may be split at one or more locations, as at 25 in FIG. 3, and there provided with fastener means 26 for releasable clamping engagement about the circumference of envelope 15. In addition, at angularly spaced locations about the clamping ring 20, there may be provided a plurality of mounting lugs, eyes or tabs 27, adapted to receive respective fasteners 28, see FIG. 2, for securement to the vehicle body. As thus far described, the lamp 14 and mounting ring 15 may be substantially conventional.

The washer attachment of the present invention is shown, apart from the vehicle, in FIG. 4, and there generally designated 30. The attachment includes an elongate tubular spray head or conduit 31, which may be configured for conforming extension partially along the envelope circumference 16 and clamping ring 20, being arcuate in the instant embodiment but capable of assuming other desired configuration. The tubular spray head or conduit 30 may be of any suitable material, say metal, plastic or the like, and may have its convex or inner side provided with a series of through holes, discharge openings or outlets 32. One end of the conduit 31 may be closed, as at 33, and the other conduit end 34 open for fluid communication through suitable additional conduit means 35 to a source of pressurized fluid, as will appear more fully hereinafter.

The conduit 31 is configured to extend along the uppermost region of its associated lamp 14, along the front wall or lens 36, and adjacent to the bead 16 of the envelope 15.

That is, the conduit 31 is located adjacent to and outward of the bead 16; and, a plurality of inward extensions, mounting tabs or fingers 40 extend from spaced locations along the conduit inwardly therefrom. The several mounting tabs or extensions 40 extend between the peripheral envelope bead 16 and clamping ring 20, being clamped in sandwiched relation therebetween. In particular, the mounting tabs 20 may each include a securement outer end portion 41 secured fast to the conduit 31, on the radially outer or convex side thereof, and an inwardly extending inner end or extension portion 42, each of which is transversely concave radially inwardly of the center of curvature of conduit 31, being specifically configured for conforming sandwiched interposition between the bead 16 and clamping ring 20, as best seen in the upper region of FIG. 2. By this specifically configured clamping sandwiched relation, the several mounting tabs are firmly secured immovably relative to the headlamp 14, and necessarily the conduit 31 is similarly secured in fixed relation relative to the headlamp. However, should the need or desire arise, the conduit 31 is quickly and easily removed from the headlamp 14, by mere opening or unclamping of the mounting ring 20, as by loosening of split ring fastener 26. The washer assembly 30 being replaceable with respect to the same or another headlamp 14, in the manner described hereinbefore.

In addition to the washer attachment 30 on the right headlamp 14, there may be a substantially identical washer attachment 45 detachably secured in similar relation with respect to the left headlamp 46. The fluid conduit means 35 of the washer attachment 30 may join a similar fluid conduit means 47 of washer attachment 45, merging at a Y-attachment 48 for fluid communication through a single conduit 49 to a fluid pressure means or pump 50. The pump 50 is in turn connected through additional fluid conduit means 51 to a reservoir or fluid supply container 52. Actuating means, such as an electric switch 53 may be electrically connected, as by conductor means 54 to the pump 50.

It will therefore be appreciated that actuation of pump 50 serves to pass cleaning fluid, such as water or other cleaning fluid, from container 52, through conduit 51, conduit 49 and branch conduits 35 and 47 to respective washer attachments 30 and 45. The cleaning fluid is discharged from the washer attachments, specifically being discharged downwardly and radially inwardly thereof through outlet openings or holes 32 for washing action across the front side or lens of the respective headlamp.

From the foregoing, it is seen that the present invention provides a unique construction of washer attachment for a vehicle headlamp which is extremely simple so as to be durable and reliable for long continued use and association with a series of replacement headlamps.

Although the present invention has been described in some detail by way of illustration and example for purposes of clarity of understanding, it is understood that certain changes and modifications may be made within the spirit of the invention.

What is claimed is:

1. A washer attachment for a vehicle headlamp including an envelope and a split mounting ring releasably clamped circumposed about the envelope, said attachment comprising a fluid conduit of circular cross section configured to extend arcuately partially along and in conforming relation with an upper region of the circumference of said envelope adjacent to said mounting ring, a plurality of spaced mounting tabs, each having a securing end portion secured to a top region of said conduit and having a laterally extending portion extending beyond one side of said conduit, said laterally extending portions of said mounting tabs being interposable between the envelope and mounting ring for mounting the conduit relative to the envelope, said conduit having a fluid inlet for connection to a fluid source, and fluid outlet means along the underside of said conduit for discharge of a cleaning fluid across the envelope.

2. A washer attachment for a vehicle headlamp according to claim 1, the mounting ring being transversely convex for conforming retaining engagement with inwardly and outwardly facing surface areas of the envelope, and said laterally extending portions of said mounting tabs being covex for conforming sandwiched relation between said mounting ring and envelope.

* * * * *